Patented Feb. 24, 1931

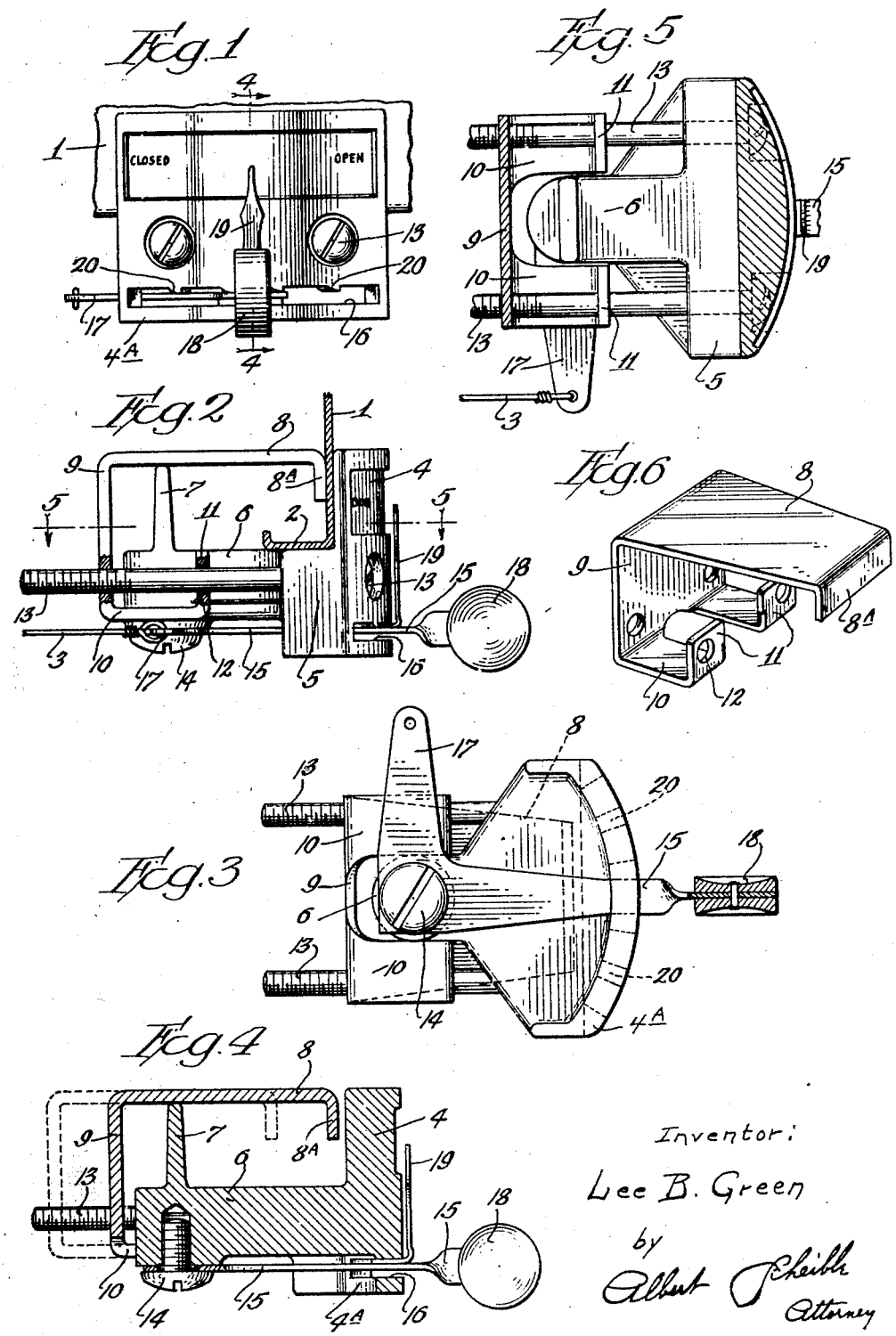

1,793,926

UNITED STATES PATENT OFFICE

LEE B. GREEN, OF LAKEWOOD, OHIO, ASSIGNOR TO THE GLOBE MACHINE AND STAMPING COMPANY, OF CLEVELAND, OHIO, A CORPORATION OF OHIO

CONTROL DEVICE FOR AUTOMOBILE RADIATOR SHUTTERS

Application filed May 3, 1930. Serial No. 449,675.

My invention relates to dash-attached devices for controlling automobile radiator shutters, heaters or the like; and in its general objects aims to provide a novel, easily manufactured and highly effective control device of this class which can easily be attached to the lower portion of an upright dash or panel from the operating side of the panel.

With a manually controlled shutter disposed in front of the radiator core of an automobile, the shutter is usually urged toward its closure position by a spring forming part of the shutter assembly, and the opening of the shutter is effected by a pull wire extending rearwardly toward the dash. Since the rearward pulling of this shutter-opening wire must be actuated from the driver's seat, or from behind the dash, a control device for this purpose is commonly attached to the lower portion of the dash.

My present invention aims to overcome numerous objections encountered with the control devices heretofore employed for actuating the pull wire (which in turn controls the shutter, heater or the like), particularly in these respects:

By providing a control device of simple and unusually rigid construction which can readily be attached as a unit to the dash without first disassembling the device and without perforating the dash, and which cannot slip downward off the dash when the dash has the usual forwardly directed stiffening ledge at its lower edge;

By providing dash-clamping means including screws which present their heads rearward of the dash, thereby avoiding the difficulties encountered in reaching clamping screws disposed forwardly of dash and under the hood of the radiator;

By arranging the clamping means so that the tightening screws guide the clamping member, and so that the screws are effectively locked against retraction without requiring locknuts or other auxiliary elements for the locking;

By providing an actuating member in the form of a simple bell-crank lever, thereby securing an effective leverage without requiring auxiliary interposed parts;

By providing for an automatic and positive latching of the lever in any one of several positions, thus eliminating an additional manual operation for effecting the latching;

By supporting this lever direct from a rigid part which includes one of the clamping elements of the device, thereby insuring rigidity for the mounting of the lever;

And by arranging a control device which can be cheaply manufactured and assembled.

Still further and also more detailed objects will appear from the following specifications and from the accompanying drawings, in which Fig. 1 is an end elevation of a control device embodying my invention, taken from the rear of the dash and including a portion of the dash.

Fig. 2 is a side elevation of the same device, taken from the left-hand side of Fig. 1, with portions of the clamping member shown in section.

Fig. 3 is a bottom view of the same control device, with the lever button shown in section.

Fig. 4 is a vertical section, taken along the line 4—4 of Fig. 1, and with dotted lines showing the position of the clamping member before the screws are tightened.

Fig. 5 is a horizontal section, taken along the line 5—5 of Fig. 2, with the rear portion of the operating lever broken away.

Fig. 6 is a perspective view of the clamping member, drawn on a reduced scale.

In the drawings, the upright dash 1 has the usual forwardly directed stiffening ledge 2 at its lower edge, and the pull wire 3 has its rear end at a lower elevation than this ledge. Bearing against the rear face of the lower portion of the dash is a face plate 4 which has a flat rear face and which is an integral riser portion at the rear end of a body casting which has its main portion disposed below the dash.

This main portion of the body casting is T-shaped in plan view (as shown in Fig. 5), so as to present a cross-head 5 adapted to bear upwardly against the dash ledge 2 for a considerable length of that ledge, and a shank 6 which extends forwardly from the said cross-head and which shank desirably has its upper face in the same horizontal plane with the top of the cross-head 5. Extending upwardly from the shank 6 at a considerable distance forward from the face plate 4 is a riser 7 which desirably extends to a height not exceeding the top of the face plate 4.

Associated with the just described body casting, which desirably is a die casting, is a clamping member which is preferably stamped from somewhat resilient metal and which is formed as shown in Fig. 6. This clamping member includes a horizontal clamp top 8, a rear web 8 A depending from the rear end of the top 8 and of less height than the riser 7, and a forward web 9 depending from the forward end of the top 8 and of greater height than the riser 7.

The stamped clamping member also includes two bottom portions 10 extending forwardly from the lower end of the forward web 9 and shorter than the body shank 6, which bottom portions extend (desirably at the same level) at opposite sides of the body shank 6, and each of which bottom portions has at its forward end a guide riser 11. These bottom portions and guide risers are spaced apart by distances at least equal to, but desirably only slightly greater than the width of the body shank 6 (as shown in the bottom view of Fig. 5) and each guide riser 11 has a perforation 12.

Extending slidably through the body casting at opposite sides of the shank 6 are two screws 13, each of which extends freely through a perforation 12 in one of the guide risers 11 and is threaded through the forward web 9 of the clamping member. These screws are desirably disposed at the same level and preferably extend at right angles to the forward or dash-engaging face of the face plate 4.

Pivoted to the bottom of the shank 6, as by an upright pivot screw 14, is a bell-crank lever which is formed of resilient metal and which has its longer arm 15 extending rearwardly through a horizontal slot 16 in the face plate 4, while its shorter arm 17 extends at a considerable angle to the said longer arm. The pull wire 3 is connected in any suitable manner with the free end of the shorter lever arm 17, and the free rear end of the longer lever arm desirably carries a flat knob 18 which can be digitally gripped for moving the lever. Fastened to the longer lever arm 15 between this knob and the rear face of the face plate 4 is a pointer 19 which cooperates with markings on the face plate (such as the words "Closed" and "Open" in Fig. 1) to indicate the position of the shutter or other controlled appliance, the rear face of the face plate 4 being desirably curved concentric with the pivot axis of the lever.

The portion of the face plate in which the slot 16 is formed is desirably an arcuate web 4 A extending downward below the shank 6 and concentric with the pivot axis of the lever, as shown in Fig. 4. Moreover, the face plate has a plurality of latching projections 20 extending downwardly into the slot 16 and all sloping downwardly in the same direction, namely the direction in which the longer lever arm 15 is moved for drawing the free end of the shorter arm 17 rearwardly to pull the wire 3 rearwardly also, and the lever is supported so that the upper face of the longer lever arm is normally higher than the lower ends of the latch teeth or projections 20.

When my appliance is to be attached to a dash, the screws 13 are first loosened sufficiently so that the stamped clamping member can be slid forwardly for a considerable distance away from the face plate 4, as for example to the position shown in dotted lines in Fig. 4. During this sliding, the riser 7 holds the top 8 of the said clamping member at a constant height above the body shank 6, and this riser cooperates at all times with the two screws in supporting the clamping member from the body casting.

With the clamping member thus slid forward sufficiently to clear the bottom ledge 2 on the dash, the forward portions of the appliance are then slipped under the dash to swing the forward web 8 A of the clamping member against the forward face of the dash and to press the top of the cross-head 5 of the body casting against the bottom of the dash. This can readily be done from the rear of the dash; and while the user is holding the appliance in the just recited position with one hand, he can then tighten both of the screws 13 so as to clamp the dash firmly between the face plate 4 and the rear web 8 A of the clamping member.

During the latter portion of this tightening, the screws 13 will flex the forward web 9 of the clamping member somewhat about the juncture of that web with the top 8, thereby cramping the screws in this web 9 through which both screws are threaded. This cramping action effectively locks the screws, although they can still be further tightened later on if desired.

With my appliance thus attached, the bearing of the dash bottom (or ledge 2) against the top of the cross-head 5 cooperates with the clamping action to insure rigidity of the appliance on the dash, and the lateral engagement of the body shank 6 by the guide risers 11 increases this rigidity by preventing the body and the clamping member from shifting horizontally with respect to each other. Hence I am able to secure an unusual rigidity of the control device on the dash without requiring any perforations in the dash, and with a quite simple, inexpensive and easily assembled device.

To facilitate the depressing of the rearward portion of the longer lever arm 15 for releasing this arm from the latch tooth 20 engaged by it, I preferably concave both faces of the button 18, as shown in Fig. 3, and twist this lever arm between the indicator 19 and the button to dispose the concaved button faces substantially upright and in general plane parallel to the pivot axis of the lever. With the button thus disposed, the user can easily grip the button between two fingers of one hand to depress the longer lever arm and to rock the lever with a single and instantaneous movement, and by suitably proportioning the lever arms I can afford sufficient leverage so that even a woman can easily use my appliance for controlling shutters having closure springs of considerable tension. As soon as the downward pressure on the button is relaxed, the resiliency of the longer lever arm will snap this upward to latch it between two consecutive latch teeth 20.

However, the mere swinging of the lever in the direction in which these teeth slope downwardly (or to the right in Fig. 1) will cause the cam faces of the teeth to depress the lever automatically so that the lever will ride over them in that direction without being manually depressed. At the same time, the arcuate web 4 A limits the downward flexing of the longer lever arm, so as to prevent an overstraining of the lever.

However, while I have illustrated and described numerous desirable details of construction and arrangement, I do not wish to be limited in these respects, since many changes might be made without departing either from the spirit of my invention or from the appended claims. So also, it is to be understood that my device will be equally suitable for controlling other apparatus than shutters (as for example car heaters), and that it might be attached to panels of other nature than the dashboards of automobiles.

I claim as my invention:

1. A control device for attachment to the lower portion of a dash, comprising: a body member including a shank extending forwardly under the dash and a face plate extending upwardly from the shank and engaging the rear face of the dash; a clamping member including a thrust part extending at right angles to the plane of the dash above the said shank and engaging the forward face of the dash, and also including a supporting part depending from the forward end of the thrust part; and threaded means extending forwardly through the face plate and the said supporting part of the clamping member for drawing the clamping member toward the said face plate; the said supporting part straddling the shank of the body member to prevent lateral shifting of the clamping member with respect to the body member.

2. A control device for attachment to the lower portion of a dash, comprising: a body member including a shank extending forwardly under the dash and a face plate extending upwardly from the shank and engaging the rear face of the dash; a clamping member including a thrust part extending at right angles to the plane of the dash above the said shank and engaging the forward face of the dash, and also including a supporting part depending from the forward end of the thrust part; and threaded means extending forwardly through the face plate and the said supporting part of the clamping member for drawing the clamping member toward the said face plate; the clamping member also including a guide portion spaced rearwardly from the supporting member, through which guide portion the threaded means extend.

3. A control device for attachment to the lower portion of a dash, comprising: a body member including a shank extending forwardly under the dash and a face plate extending upwardly from the shank and engaging the rear face of the dash; a clamping member including a thrust part extending at right angles to the plane of the dash above the said shank and engaging the forward face of the dash, and also including a supporting part depending from the forward end of the thrust part; and threaded means extending forwardly through the face plate and the said supporting part of the clamping member for drawing the clamping member toward the said face plate; the thrust part of the clamping member having an intermediate portion thereof supported by the shank of the body member.

4. A control device for attachment to the lower portion of a dash, comprising: a body member including a shank extending forwardly under the dash and a face plate extending upwardly from the shank and engaging the rear face of the dash; a clamping member including a thrust part extending at right angles to the plane of the dash above the said shank and engaging the forward face of the dash, and also including a supporting part depending from the forward end of the thrust part; and threaded means extending forwardly through the face plate and the said supporting part of the clamping member for drawing the clamping member toward the said face plate; the shank having an integral riser spaced forwardly from the face plate and engaging the bottom of the thrust part of the clamping member.

5. A control device for attachment to the lower portion of a dash, including: a body member including a shank extending forwardly under the dash and a face plate extending upwardly from the shank and engaging the rear face of the dash; a clamping member including a thrust part extending above the said shank and engaging the forward face of the dash, a supporting web depending from the forward end of the said thrust part, two arms extending rearwardly from the said supporting web at opposite sides of the said shank; and two screws extending rearwardly through the face plate respectively above the said arms and each threaded through the supporting web.

6. A dash-attached control device as per claim 5, in which each of the said arms slidably engages a side of the said shank.

7. A dash-attached control device as per claim 5, in which each of the said arms has at its rear end a riser finger in edgewise engagement with a side of the said shank.

8. A dash-attached control device as per claim 5, in which each of the said arms has at its rear end a riser finger provided with a guide aperture through which one of the said screws extends.

Signed at Cleveland, Ohio, April 30th, 1930.

LEE B. GREEN.